(12) United States Patent
Raman et al.

(10) Patent No.: US 7,623,067 B2
(45) Date of Patent: Nov. 24, 2009

(54) FAST SEARCH GPS RECEIVER

(75) Inventors: Sundar Raman, Fremont, CA (US);
Reza Abtahi, Santa Clara, CA (US);
Qingwen Zhang, Torrance, CA (US);
Gengsheng Zhang, Cupertino, CA (US);
Lionel Jacques Garin, Palo Alto, CA (US)

(73) Assignee: SiRF Technology Holdings, Inc., San Jose, CA (US)

( * ) Notice: Subject to any disclaimer, the term of this patent is extended or adjusted under 35 U.S.C. 154(b) by 320 days.

(21) Appl. No.: 10/530,069

(22) PCT Filed: Oct. 1, 2003

(86) PCT No.: PCT/US03/31123

§ 371 (c)(1),
(2), (4) Date: Oct. 10, 2005

(87) PCT Pub. No.: WO2004/031798

PCT Pub. Date: Apr. 15, 2004

(65) Prior Publication Data

US 2006/0152409 A1    Jul. 13, 2006

Related U.S. Application Data

(60) Provisional application No. 60/415,425, filed on Oct. 1, 2002.

(51) Int. Cl.
*G01S 1/00* (2006.01)
(52) U.S. Cl. ................................................. 342/357.12
(58) Field of Classification Search ................................
342/357.01–357.17
See application file for complete search history.

(56) References Cited

U.S. PATENT DOCUMENTS

| | | | | |
|---|---|---|---|---|
| 6,570,531 B1 * | 5/2003 | Stratton et al. | ......... | 342/357.06 |
| 2003/0231132 A1 * | 12/2003 | Park et al. | ............... | 342/357.15 |
| 2004/0196183 A1 * | 10/2004 | Roh | ........................ | 342/357.12 |

* cited by examiner

*Primary Examiner*—Thomas H Tarcza
*Assistant Examiner*—Nga X Nguyen
(74) *Attorney, Agent, or Firm*—Pillsbury Winthrop Shaw Pittman LLP (57) ABSTRACT

A system within a multi-channel GPS receiver that searches for Global Positioning System (GPS) satellites by receipt of a plurality of GPS signals where each GPS signal corresponds to a GPS satellite having a GPS satellite identification number (ID) is shown. The system may include a controller in control of the multi-channel GPS receiver that assigns each GPS satellite ID that corresponds to each of the plurality of GPS signals received by the multi-channel GPS receiver to an individual channel of the multi-channel GPS receiver and a monitoring channel selected by the controller from the multi-channel GPS receiver that monitors the received GPS signal.

36 Claims, 4 Drawing Sheets

FAST SEARCH GPS RECEIVER

CROSS REFERENCE TO RELATED APPLICATIONS

This application claims priority, under 35 USC § 119(e), to U.S. Provisional Application Ser. No. 60/415,425, filed on Oct. 1, 2002, and titled "MULTI-CHANNEL SPS RECEIVER WITH CONTINUOUS SIGNAL AND SATELLITE MONITORING," which is herein incorporated by reference.

BACKGROUND OF THE INVENTION

1. Field of the Invention

This invention relates generally to the field of wireless communications. In particular, the invention relates to searching for Global Positioning System ("GPS") satellites with a GPS receiver.

2. Related Art

The worldwide utilization of Global Positioning System ("GPS") devices is growing at a rapid pace. GPS devices are being utilized as stand-alone devices and as part of new integrated devices such as wireless devices that include two-way radios, portable televisions, personal communication system ("PCS"), personal digital assistants ("PDAs"), cellular telephones (also known as "mobile phones"), Bluetooth, and satellite radio receivers. An example of an integrated GPS wireless device includes the GPS enabled wireless telephones that support the "Enhanced 911" (also known as E911) requirement enacted by the United States ("U.S.") Congress through the Federal Communication Commission ("FCC") that requires that wireless telephones be locatable to within 50 feet once an emergency call, such as an E911, is placed by a given wireless telephone.

GPS devices are devices that receive GPS signals from a GPS constellation of satellites and in response determine the position of the GPS device on the earth. The GPS constellation of satellites is the space segment of GPS that includes an array of GPS satellites that transmit highly accurate, time-coded information that permits a GPS receiver within a GPS device to calculate its exact location in terms of latitude and longitude on the earth as well as the altitude above sea level. The U.S. GPS system (also known as "NAVSTAR") is designed to provide a base navigation system with accuracy to within 100 meters for non-military use and greater precision for the military (with Selective Availability ON).

The GPS satellites orbiting above the earth contain transmitters, which send highly accurate timing information to the GPS receivers on earth. The fully implemented U.S. GPS system consists of 21 main operational GPS satellites plus three active spare GPS satellites. These GPS satellites are arranged in six orbits, each orbit containing three or four GPS satellites. The orbital planes form a 55° angle with the equator. The GPS satellites orbit at a height of 10,898 nautical miles (20,200 kilometers) above earth with orbital periods for each GPS satellite of approximately 12 hours.

Each of the orbiting GPS satellites contains four highly accurate atomic clocks. These atomic clocks provide precision timing pulses used to generate a unique binary code (also known as a pseudo random, "PRN," or pseudo noise "PN" code) that is transmitted to earth. The PN code identifies the specific GPS satellite in the GPS constellation. The GPS satellite also transmits a set of digitally coded ephemeris data that completely define the precise orbit of the GPS satellite. The ephemeris data indicate where the GPS satellite is at any given time, and its location may be specified in terms of the satellite ground track in precise latitude and longitude measurements. The information in the ephemeris data is coded and transmitted from the GPS satellite providing an accurate indication of the exact position of the GPS satellite above the earth at any given time. A ground control station updates the ephemeris data of the GPS satellite once per day to ensure accuracy.

A GPS receiver configured in a GPS device is designed to pick up signals from three, four, or more GPS satellites simultaneously. The GPS receiver decodes the information and, utilizing the time and ephemeris data, calculates the approximate position of the GPS device. The GPS receiver contains a floating-point processor that performs the necessary calculations and may output a decimal display of latitude and longitude as well as altitude on the GPS device. Readings from three GPS satellites are necessary for latitude and longitude information. A fourth GPS satellite reading is required in order to compute altitude.

The location of a GPS device is usually hindered in dense environments such as downtown city blocks. A GPS receiver within the GPS device should have the capability to acquire and track the GPS satellites under the conditions that the typical user of a GPS device such as an integrated GPS and wireless telephone device will encounter. Some of these conditions include utilization of the GPS device indoors and in dense urban areas that have a limited sky view, such as in downtown areas with skyscrapers blocking the views of the normally available satellites, etc. While these environments are typically manageable for terrestrial-based wireless communications systems, they are difficult environments for a GPS device to operate in. For example, traditional "autonomous mode" GPS devices (i.e., GPS devices where the GPS receiver acquires the GPS signals from the GPS satellites, tracks the GPS satellites, and, if desired, performs navigation without any outside information being delivered to the GPS system) have problems with long Time-To-First-Fix ("TTFF") times and, additionally, have a limited ability to acquire the GPS satellite signals under indoor or limited sky-view conditions.

Thus, many new high-sensitivity GPS receivers are generally designed to detect and track GPS signals strength that are very low and undetectable by conventional (i.e., non-high-sensitivity) GPS receivers because the signal detection involves higher integration and other complex signal processing techniques. Unfortunately, these high-sensitivity GPS receivers have problems that include locking to weak or residual GPS signals and having limited signal detection capability when supplied with improper initialization data.

High-sensitivity GPS receivers designed to detect and track very low strength GPS signals generally suffer from locking to residual GPS signals that are caused by inter-satellite cross-correlation and code and/or Doppler auto-correlation in a relatively strong signal environment because a GPS receiver designed for indoor use is capable of detecting very low power GPS signals that have a magnitude value typically below 30 dB-Hz. It is appreciated by those skilled in the art that a cross-correlation occurs when a channel in a GPS receiver is searching for a GPS signal from GPS satellite "X" but it detects a residual GPS signal from another GPS satellite "Y." Similarly, it is appreciated that an auto-correlation occurs when a channel in a GPS receiver detects a residual GPS signal on a wrong code or Doppler frequency.

When a GPS receiver is locked to one of these residual GPS signals instead of the strong main GPS signal (also known as "a strong GPS signal"), it is known as a "false lock" and the GPS receiver is described as being "false locked." The false lock phenomenon usually happens when the main GPS signal is strong—such as in an open sky environment. In this case, the strong main GPS signal causes the cross or auto-correlated signals to become detectable by the typical high-sensitivity GPS receiver. A false lock is detrimental to a GPS receiver since it introduces an incorrect measurement into the navigation solution of the GPS receiver, thereby causing several kilometers of error in the reported position of the GPS device. In general, the false lock phenomenon usually happens when the main GPS signal is strong, as in open sky environment, which causes the cross or auto-correlated signals to become detectable. As an example, if a strong main GPS signal has a strength magnitude value of approximately 45 dB-Hz, the typical residual GPS signals could have strength magnitude values of about 25 db-Hz and a high-sensitivity GPS receiver designed for indoor usage will generally be capable of locking to the wrong residual GPS signal and corrupting its navigation filter.

Additionally, another problem associated with false locking to a residual GPS signal occurs when a high-sensitivity GPS receiver searches for a strong GPS signal but instead locks on to a weak GPS signal when a strong GPS signal was actually available but missed by the initial search of the high-sensitivity GPS receiver. As a result, the high-sensitivity GPS receiver locks to a weak GPS signal when a strong GPS signal was available. In this case, the high-sensitivity GPS receiver may have missed the strong GPS signal for several reasons, including the situation where the strong GPS signal was not present at the time of the search but appeared either immediately or shortly after—such, as for example, a few seconds—the search, or the situation where the high-sensitivity GPS receiver simply missed detecting the strong GPS signal.

As far as having improper initialization data, generally when a GPS receiver is turned on it utilizes initialization data stored in its non-volatile memory in order to acquire the GPS satellites faster (i.e., with a lower TTFF) than it would if it did not have the initialization data, thereby consequently producing quicker position information. This type of setup is typically known as a "warm start" versus a "cold start" where the GPS receiver has no initialization data. Typically the last computed position, ephemeris/almanac data and the time kept by a real time clock of the GPS receiver stored in memory may be utilized by the GPS receiver at startup (i.e., when powered on) for a faster acquisition.

Alternatively, the GPS receiver may be initialized by an external source such as an end-to-end server/client solution such as E911 applications. In this latter case, the same kind of data may be conveyed to the GPS receiver at the time the GPS receiver is powered on.

However, a problem arises if the initialization data is wrong, unreliable or outdated. If the initialization data is incorrect, the GPS receiver will calculate the wrong position coordinates for the GPS device because the GPS receiver attempts to create a visible list of GPS satellites initially based on the initialization data. If the initialization data is wrong, the resulting visible list will also be wrong and the GPS receiver will incorrectly expect to receive GPS signals from GPS satellites that may not be physically visible (i.e., they may be below the horizon), thereby causing a very long TTFF. As an example, if a GPS receiver is turned off in one geographic location (such as in the US) and then powered on in a different geographic location (such as in Japan), the GPS receiver will at first attempt to create a visible list based on the initialization data stored from its last known position within the US. However, most GPS satellites that would have been visible to the GPS receiver at the last known location of the GPS receiver within the US will now be below the horizon and not visible to the GPS receiver in Japan.

Unfortunately, most GPS receivers will attempt to search for GPS satellites based on their created visible lists for expected strong GPS satellites (i.e., the GPS satellites that are expected to be present at elevations that provide strong GPS signals). Assuming no fake (also known as "false") locks, if a GPS receiver does not find any strong GPS signals, the GPS receiver will begin to search for weak satellites (i.e., the GPS satellites that are expected to be present at elevations that provide weaker GPS signals). A GPS receiver may continue to perform these searches for quite some time before exhausting the search possibilities of the incorrect visible list. Once the visible list search possibilities are exhausted, the GPS receiver will then search the whole list of 32 possible satellites. It is appreciated that this takes too long for most practical applications.

In the case of an erroneous fake lock, there is a possibility that the GPS receiver may lock on to strong GPS satellites that it believes to be weak GPS satellites based on its incorrect visible list because it receives GPS signals from strong GPS satellites that it does not expect (since it is looking for weak GPS satellites, based on the incorrect visible list, that are not present). This situation typically leads to a cross-correlation problem because the GPS receiver is locked to a GPS signal that it thinks is a weak GPS signal from a GPS satellite that is indicated in its incorrect visible list, when in reality the GPS receiver is locked to a strong GPS signal of a GPS satellite that is somewhere else.

Attempts at solving these problems in the past have included utilizing time-out solutions, extensive repeat code and Doppler searches to validate an initial lock to a GPS satellite, and measurement rejection using the RAIM algorithm. However, each of these approaches has significant drawbacks and limitations that make them at best sub-optimal solutions. For example, the approach in the time-out solution is that if the GPS receiver cannot track GPS satellites within a fixed period of time, a cold start initialization can be performed. However, the problem with this method is loss of sensitivity and longer TTFF for an indoor GPS application. In an extensive repeated code and Doppler search to validate an initial lock to satellite approach, the problem is that the process is time consuming and can cause very long TTFF. Also this approach cannot solve the false lock problem due to cross-correlation. Finally, in the measurement rejection by using the RAIM algorithm approach, the approach only addresses the effect and not the cause of the problem. As such, in the case of multiple-channel false lock situations the RAIM method is ineffective.

Therefore, there is a need for a method and system that allows a GPS receiver that is designed to detect and track low GPS signals to operate properly in high GPS signal environments while at the same time allowing operation in low GPS signal environments where stored initialization data may be wrong or unreliable.

SUMMARY

A system within a multi-channel GPS receiver that searches for Global Positioning System (GPS) satellites by receipt of a plurality of GPS signals where each GPS signal corresponds to a GPS satellite having a GPS satellite identification number (ID) is shown. The system may include a controller in control of the multi-channel GPS receiver that assigns each GPS satellite ID that corresponds to each of the plurality of GPS signals received by the multi-channel GPS receiver to an individual channel of the multi-channel GPS receiver and a monitoring channel selected by the controller from the multi-channel GPS receiver that monitors the received GPS signal.

Alternatively, the system may also be within a multi-channel GPS receiver that is able to receive a plurality of GPS signals wherein each GPS signal corresponds to a GPS satellite that has a GPS satellite identification number (satellite ID) and each GPS signal has a corresponding GPS satellite Doppler frequency. In this implementation, the system may include a controller that communicates with the multi-channel GPS receiver and a memory in the system coupled to the controller having an initial visible list of GPS satellites and a GPS satellite constellation list. Additionally, the system may also include a weak list of GPS satellites identified by the controller and stored in the memory by upon a search of the plurality of GPS signals that utilizes a search list of the GPS satellites that was generated from the weak list of GPS satellites.

As an example of operation, the system may perform a process that includes generating a weak list of GPS satellites from the received plurality of GPS signals and generating a search list of GPS satellites from the weak list of GPS satellites. The process may also include searching the received plurality of GPS signals utilizing the search list of GPS satellites and determining whether a strong GPS satellite signal exists from the received plurality of GPS signals.

Additionally, as another example of operation, the system may perform another process that includes assigning each GPS satellite ID corresponding to each received GPS signal from the received plurality of GPS signals to an individual channel of the multi-channel GPS receiver and selecting a channel of the multi-channel GPS receiver as a monitoring channel. Moreover, the process may also include monitoring the received GPS signals with the monitoring channel.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

DETAILED DESCRIPTION OF THE PREFERRED EMBODIMENTS

A typical Global Positioning System ("GPS") system has approximately 12 satellites that may be visible at any one time to a wireless device. GPS means any system utilizing satellites and/or land-based communications devices for providing or enabling the determination of a location of the GPS device on the earth, including but not limited to: the United States ("U.S.") global positioning system (herein referred to simply as "GPS") known as NAVSTAR, GLONASS, LORAN, Shoran, Decca, or TACAN.

Figure 1:
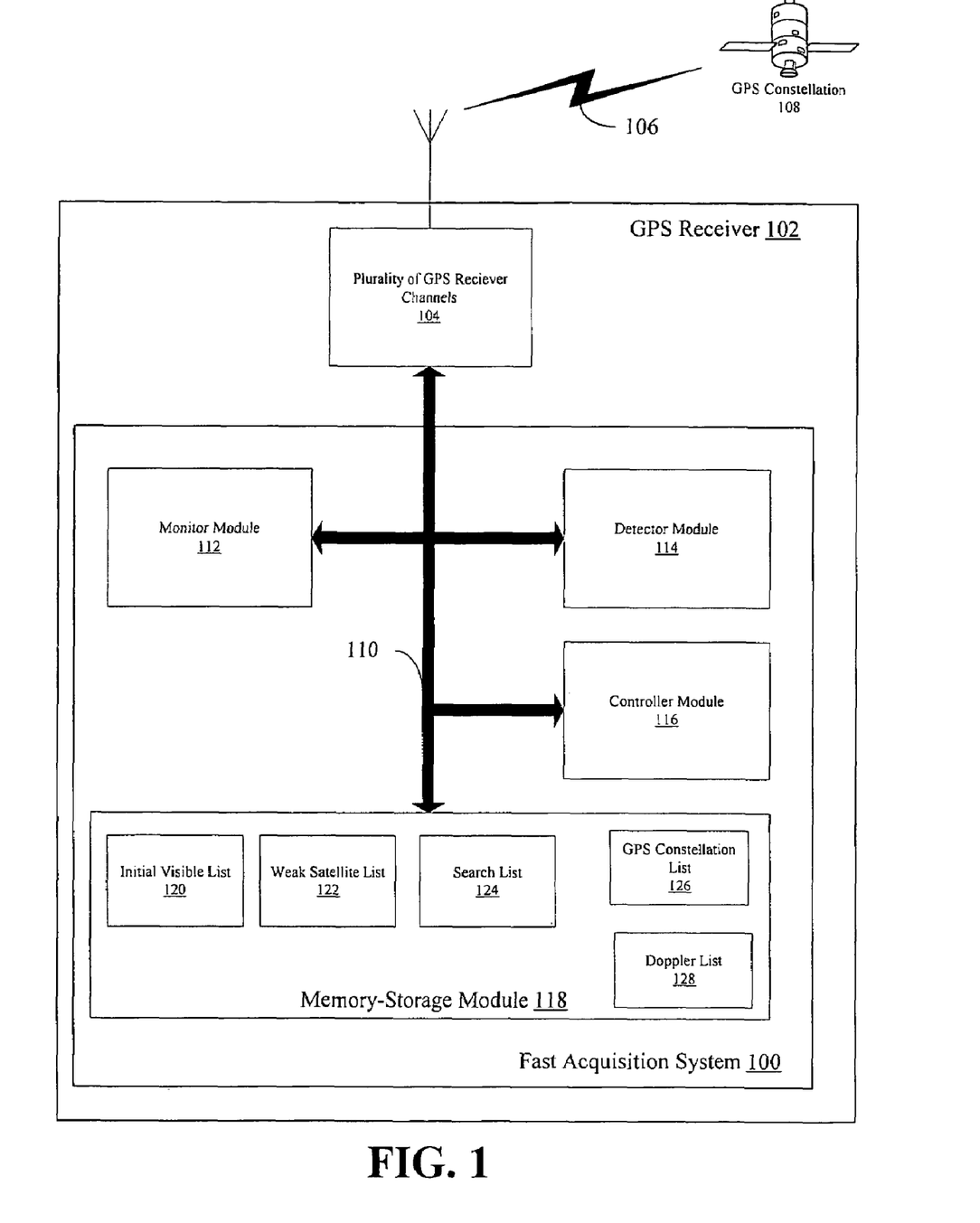
FIG. 1 is a block diagram for exemplary implementation of a Fast Acquisition System within a GPS receiver.

In FIG. 1, a Fast Acquisition System 100 is shown within a GPS receiver 102. The GPS receiver 102 includes a plurality of GPS receiver channels 104 for receiving a plurality of GPS signals 106 from a GPS satellite constellation 108 that includes a plurality of GPS satellites (not shown). The plurality of GPS receiver channels 104 is in signal communication with the fast acquisition system 100 via a signal path 110. The fast acquisition system 100 may include a monitor module 112, detector module 114, controller module 116, and memory-storage module 118, all in signal communication with each other via signal path 110. The signal path 110 may be an electrical bus if the Fast Acquisition System 100 is implemented with either discrete components or multiple integrated circuits, or it may be a signal path completely within a signal-integrated circuit if the Fast Acquisition System 100 is integrated into a signal integrated circuit.

The monitor module 112, detector module 114, controller module 116 may be implemented as software modules resident on the memory-storage module 118 that are executed by a microprocessor (not shown). The microprocessor may be any general processor, RISC processor (such as the line of processor designed by ARM Ltd of the United Kingdom), ASIC, DSP or equivalent.

The detector module 114 may include a threshold detector (not shown). The memory-storage module 118 may include an initial visible list 120, weak satellite list 122, search list 124, GPS constellation list 126, and Doppler list 128. The different lists may be implemented in a data structure such as an array.

As an example of operation, the Fast Acquisition System 100 may operate by detecting strong GPS satellites quickly and thus updating the search list 124 with these strong GPS satellites. In one exemplary implementation, the Fast Acquisition System 100 allows for continuously monitoring different GPS receiver channels that are locked to different weak GPS signals.

It is appreciated by those of skill in the art, that there are generally two types of energy searches that the GPS receiver 102 may utilize for identifying the correct code and Doppler frequency of a GPS satellite (not shown) of the GPS constellation 108, and consequently locking on to the GPS satellite signal. The GPS receiver 102 may begin with a low-sensitivity search to find the GPS signals 106 that are relatively strong (i.e., higher than 35 dB-Hz) because of the speed advantage of this type of search. If a GPS signal is strong, a low-sensitivity search performed by the GPS receiver 102 may quickly lock to and track the GPS signal. If this first search fails, the GPS receiver 102 may resume with a higher-sensitivity or longer integration search method. A high-sensitivity search may find signals below 35 db-Hz but it is appreciated by those skilled in the art that it will take longer to find and lock to the GPS signals 106 utilizing the high-sensitivity search.

In operation, the Fast Acquisition System 100 solves the problem of a high-sensitivity search producing a false lock if the GPS receiver 102 misses the main (i.e., a strong) GPS signal, by dedicating a GPS receiver channel (known as a "dedicated monitoring channel" or "monitoring channel") of the plurality of GPS receiver channels 104 to perform a continuous low-sensitivity search with a wider window on all the GPS satellites that are being tracked on the other GPS receiver channels of the plurality of GPS receiver channels 104 with weak GPS signal strengths to verify that these tracked GPS satellites are not false locked.

Figure 2:
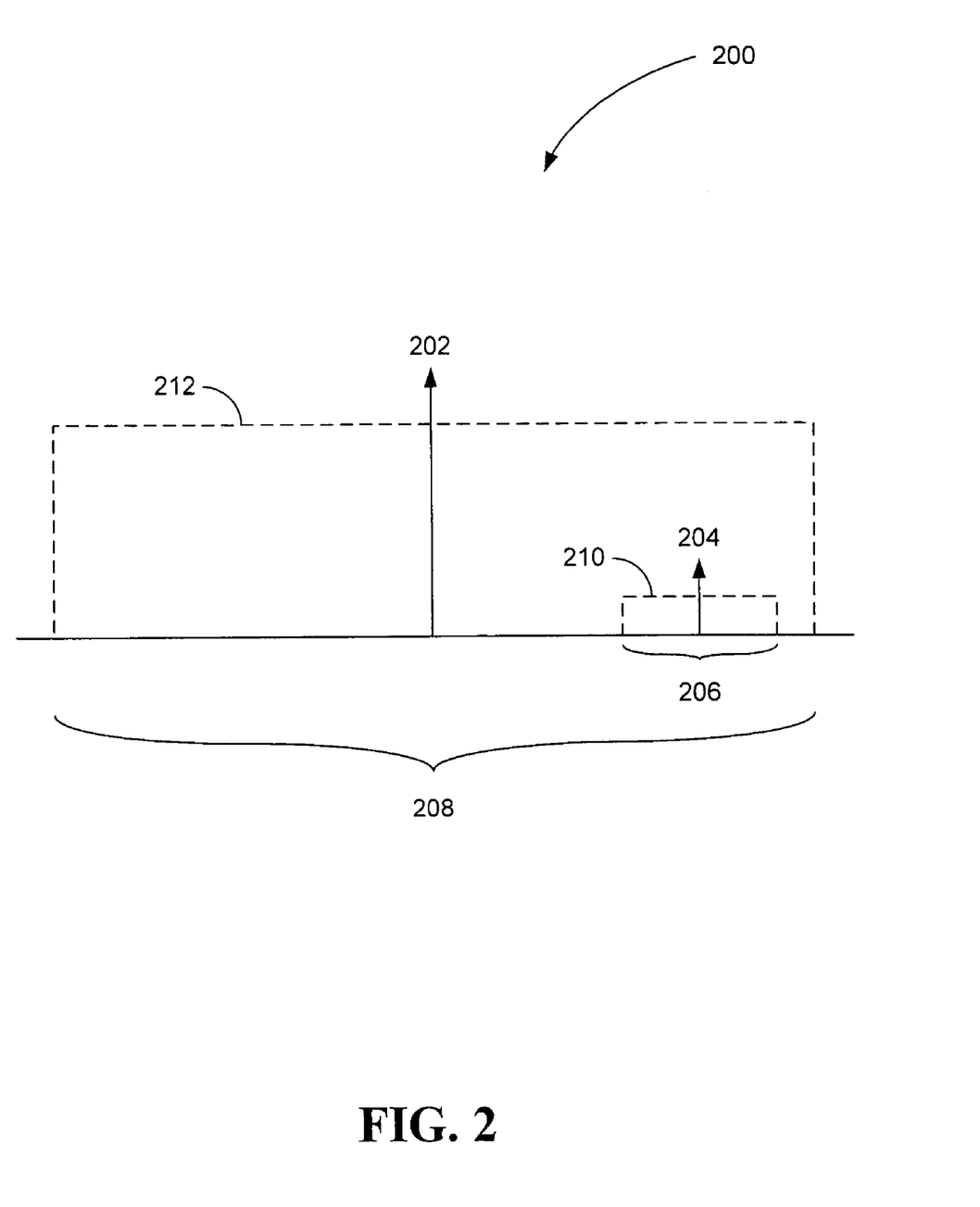
FIG. 2 illustrates a plot of GPS signal detection by the Fast Acquisition System for both a received strong GPS signal and a weak GPS signal.

In FIG. 2, a graphical representation 200 is shown that describes an exemplary process performed by the Fast Acquisition System 100 of FIG. 1 utilizing a monitoring channel. In this example, if a visible GPS satellite has a main GPS signal 202 of approximately 45 dB-Hz in magnitude, it may also have a residual signal 204 of approximately 25 dB-Hz in magnitude because of cross-correlation or auto-correlation effects. If a channel of the plurality of GPS receiver channels 104 is erroneously locked to the residual signal 204 of this GPS satellite because of the high-sensitivity reduced window search 206, the dedicated monitoring channel may start a low-sensitivity wide-window 208 search on the same GPS satellite that will eventually find the main GPS signal 202. By comparing the carrier-noise-densities ("C/Nos") of the locked channel and monitoring channel with a comparator (such as a threshold detector indicating a high-sensitivity search threshold 210 at 20 dB-Hz for residual signal 204 and low-sensitivity search threshold 212 at 35 dB-Hz), the GPS receiver 102 will detect the false lock of the locked channel and discard the false locked signal 204 on the locked channel while keeping the proper GPS signal 202 locked to the monitoring channel. The controller module 116 would then switch the functions of the two channels designating the previously locked channel as the new monitoring channel, and designating the old monitoring channel as the new locked channel, which is now locked to the proper GPS signal.

As a general example of the implementation of the Fast Acquisition System 100 utilizing a monitoring channel, FIG. 1, in FIG. 2, if the Fast Acquisition System 100 is part of the GPS receiver 102 having a plurality of GPS receiver channels 104 (such as a 12-channel GPS receiver), at least one GPS receiver channel of the plurality may be utilized as the monitoring channel for false lock detection. The other eleven remaining channels will perform their normal search sequences. An advantage of this method is that there is no impact on the GPS receiver 102 sensitivity because it does not disturb the non-monitoring channels' (i.e., the "normal channels") low-signal detection procedures.

When a false lock is detected the monitoring channel and the false locked normal channel switch their roles. The monitoring channel which is now tracking the true signal will be set as the normal channel and the false locked channel will be initialized and play the role of the new monitoring channel.

In another example of operation of the Fast Acquisition System 100, when the GPS receiver 102 is powered, on the Fast Acquisition System 100 typically utilizes its internally stored data (in the memory-storage module 118) from the previous session. This internally stored data may include position, time, ephemeris or almanac data to generate an initial visible list 120 of GPS satellites that are visible at the current position and time. Searching only this visible satellite list 120 instead of the entire GPS constellation list 126 significantly reduces the time to track and the TTFF of the Fast Acquisition System 100.

Similarly the Fast Acquisition System 100 may receive the same kind of initialization data from an external source via external aiding. Again in this type of example, wrong or inaccurate initialization data (whether initially stored or aided from an external aiding source) may generate a false list for visible satellites in the initial visible list 120 that might cause a prior art GPS receiver to search indefinitely for GPS satellites that are invisible at the current position of the GP receiver. However, in the Fast Acquisition System 100, a monitoring channel may be established that is capable of recovering the GPS receiver 102 from the above situation because the Fast Acquisition System 100 may open the search list 124 of the monitoring channel to include also GPS satellites that are not part of the initial visible list 120. As an example, in Fast Acquisition System 100, as soon as the monitoring channel locks to a GPS satellite, the elevation of the GPS satellite is evaluated utilizing the initialized data in the Memory-Storage Module 118 and if GPS satellite turns out to be below the horizon, all initialized data in Memory-Storage Module 118 is invalidated and a more accurate visible list (i.e., the search list 124) is generated and the new GPS satellites are assigned to other channels.

Figure 3:
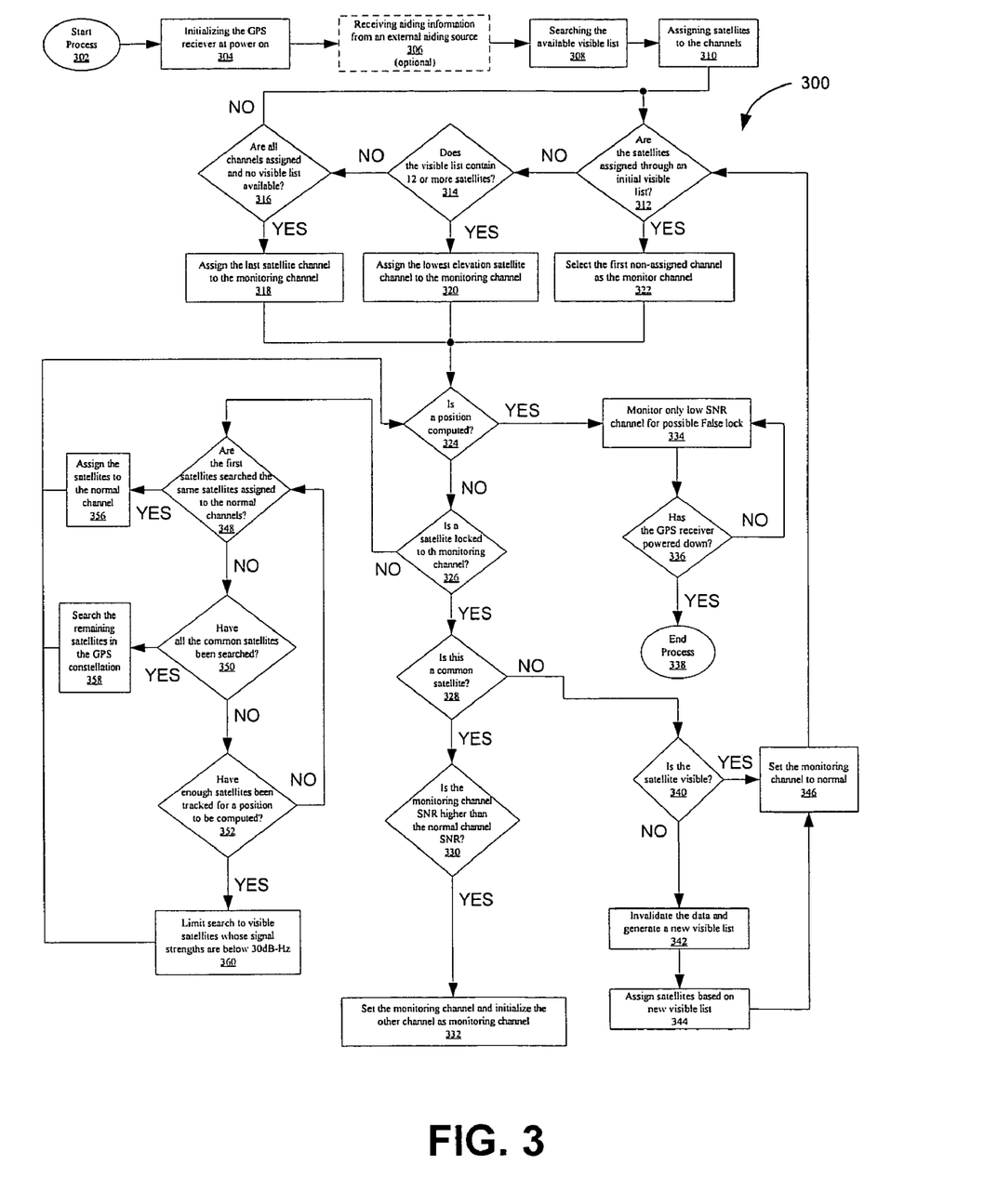
FIG. 3 illustrates a flowchart of an exemplary process performed by the Fast Acquisition System shown in FIG. 1 when utilizing a continuous monitoring channel.

FIG. 3 is a flowchart 300 of the example process performed by the Fast Acquisition System 100 utilizing a monitoring channel. The process may be used to select a monitoring channel in a 12-channel receiver. If the satellites are assigned through an initial visible list, the first non-assigned channel is selected. Then, if the visible list contains 12 or more satellites, the channel assigned to the lowest elevation satellite is initialized and selected. Additionally, if all channels are assigned and no visible list is available, the last channel is selected. The process may include rules that apply to the selection of the satellites by the monitoring channel, such as: (1) the first satellites searched are the same satellites assigned to the normal channels; (2) after all common satellites are searched, the remaining satellites in the GPS constellation are searched; (3) step (2) above is repeated until enough satellites are tracked for a position to be computed; and (4) as soon as a valid position is computed, the search will be limited to visible satellites whose signal strengths are below 30 dB-Hz.

As another exemplary process of operation, the Fast Acquisition System 100, FIG. 1, may be utilized to determine the strong GPS signals that may be assigned to the plurality of GPS receiver channels 104 in a fast acquisition process that runs in the background. This exemplary process of Fast Acquisition System 100 will detect strong GPS satellites quickly and thus update the tracking list with these strong GPS satellites to reduce the effects of false locks caused by interference from these strong signals.

In general, the basic operation of the Fast Acquisition System 100 may include an acquisition sub-process, a search sequence and sub-process of assigning the GPS receiver channels after successful detection of at least one strong GPS signal.

In the acquisition sub-process, it would be preferable to detect and acquire strong satellites with signal strength greater than about 40 dB-Hz, a probability of detection ("$P_d$") of approximately 0.9 or greater, and probability of false alarm ("$P_{fa}$"), which is approximately negligible—such as a $P_{fa}$ less than about 0.05.

As an example of implementation, a fast-Fourier transform ("FFT") based correlation may be utilized with a coherent integration that may be set to approximately 2 milliseconds. The number of Doppler frequency bins to search may be restricted or reduced to limit the time required to perform the search. In this example, only those Doppler frequency bins that have a high probability of interfering may be checked.

Additionally, every weak GPS satellite (such as any GPS signal below approximately 36 dB-Hz) may be first checked for autocorrelation based on a false lock. If a false lock is not detected, then a fast search for any potential interferers for this weak GPS satellite may be done. This may involve searching for strong GPS satellites from a strong GPS satellite list. A FFT correlation may then be done between the input GPS signal (i.e., the weak detected GPS signal) and the locally generated PRN code of the strong GPS satellite at a Doppler frequency offset value corresponding to the detected weak GPS signal.

Additional Doppler frequency values such as ±1 kHz, ±2 kHz, ±3 kHz, ±4 kHz and ±5 kHz through ±10 kHz frequency offset from the Doppler frequency value of the weak GPS satellite may then be utilized if computing resources permit. It is appreciated by those skilled in the art, that typically only a limited number of Doppler frequency bins need to be searched because the cross-correlation is generally worst for these integer offset values.

The output of the FFT correlations would result in a threshold detector decision of whether the strong GPS satellite of interest is either present or absent. If the threshold is crossed, by the output of correlations, indicating the presence of the strong GPS signal, then a GPS receiver channel will be assigned as described below and tracking of the GPS satellite would continue as normal. If threshold is not crossed, indicating the absence of the strong GPS signal, the next GPS satellite in the list may be searched.

An example of the time required for the FFT correlation may be approximately 200 milliseconds that would correspond to one Doppler frequency bin and one GPS satellite. However, this process may also be run as a background task with some additional overhead in time that may increase the 200 milliseconds time to about 300 milliseconds for the example correlation. It is appreciated, that for every additional Doppler frequency bin and every satellite, this time should be increased accordingly. Therefore, in the example of two Doppler frequency bins and six satellites, the process may take about 3.5 seconds of time because it would be 2×6×300 milliseconds.

It is appreciated by those skilled in the art, that while a FFT has been selected as an example implementation of the correlation process, the invention is not limited to it. Other types of correlators, including matched filters or banks of correlations, adder trees or any combination thereof, may easily be utilized without departing from the scope of the invention.

In the search sequence sub-process, the Controller Module 116 may create and maintain the weak satellite list 122, the Doppler list 128, and the search list 124. As an example, the weak satellite list 122 may be a list that corresponds to all GPS satellites that are currently tracked and whose C/NO is less than approximately 33 dB-Hz. The Doppler list 128 may be a list that includes the Doppler frequency value of the weak GPS satellite currently under check at offsets of ±0, ±1, ±2, ±3, . . . , ±10 KHz. Finally, the search list 124 may be a list that includes the list of all GPS satellites from the GPS constellation that are not included in the weak satellite list 122.

In the channel assigning sub-process, after a successful detection the channel assigned to the weak GPS satellite may be removed and replaced with the GPS satellite corresponding to the new successful detection. If multiple strong GPS satellites are found corresponding to the Doppler frequency value of the weak GPS satellite, then the first strong GPS satellite may replace the weak GPS satellite and new channels will be made available for the other strong GPS satellites. If no free channels are available for assignment, the weak GPS satellite with the lowest elevation may then be replaced with the strong GPS satellite.

Figure 4:
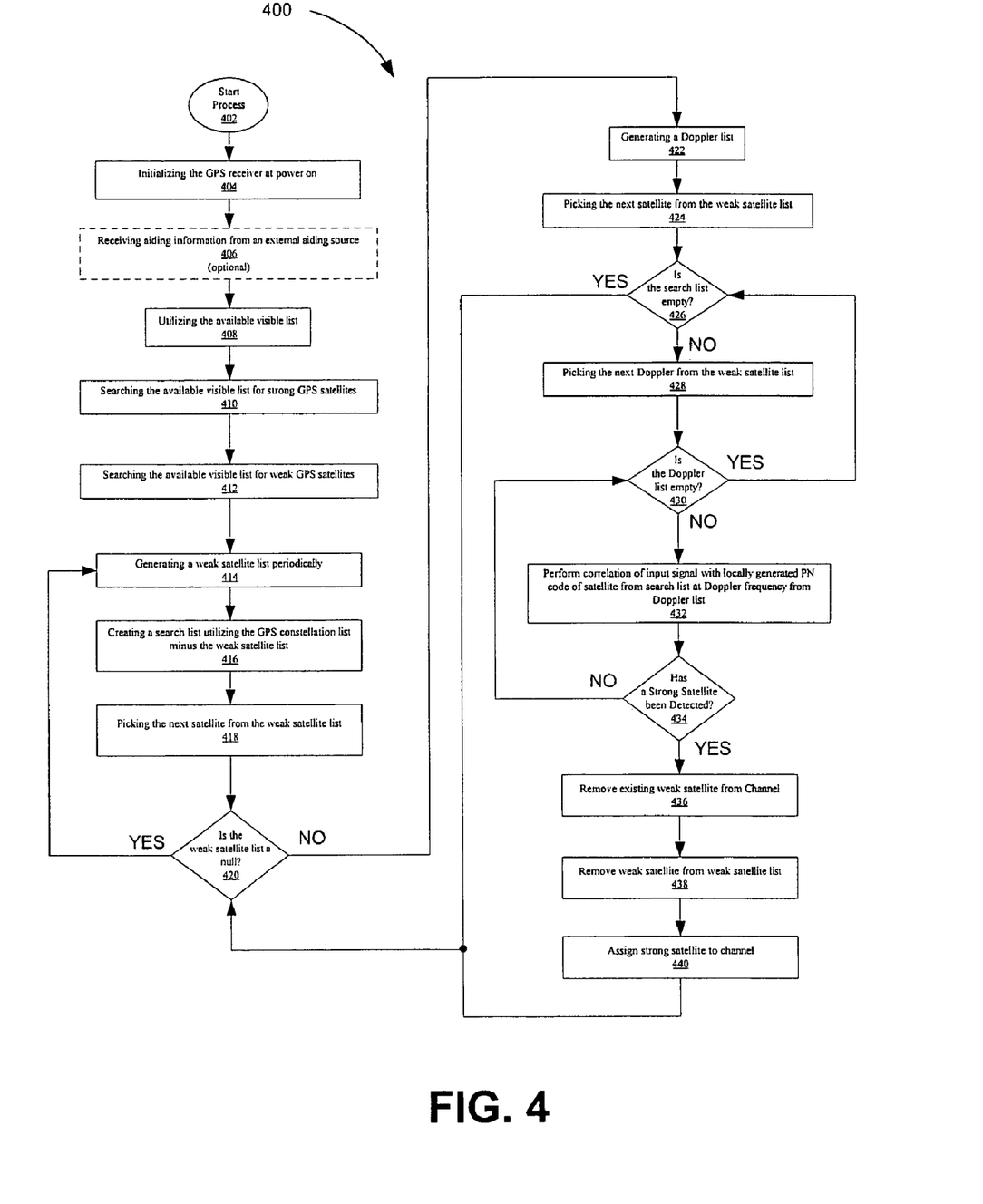
FIG. 4 illustrates a flowchart of another exemplary process performed by the Fast Acquisition System of FIG. 1.

In FIG. 4 a flowchart 400 is shown for the above described exemplary process performed by the Fast Acquisition System 100 of FIG. 1. In FIG. 4, the process begins 402 when the GPS receiver 102, FIG. 1, is powered on and initialized in step 404. Once initialized, the GPS receiver 102, via the controller module 116, checks the Memory-Storage Module 118 for any available pre-programmed initial visible list 120 of GPS satellites in step 408. If the initial visible list 120 is available the GPS receiver 102 is able to perform a "warm start." Alternatively, if the initial visible list 120 is not available the GPS receiver 102 is not able to perform a "warm start" and instead performs a "cold start."

The initial visible list 120 of GPS satellites may either be the stored visible list of the strong GPS satellites that the GPS receiver 102 acquired and tracked previously when the GPS receiver 102 was last operating or, optionally, the initial visible list 120 may be a created visible list that is generated by the GPS receiver 102 in response to receiving initialization data via aiding information from an external aiding source (not shown) such as cellular, Bluetooth or other similar type of wireless network in step 406.

Once the controller module 116 obtains the initial visible list 120 from the Memory-Storage Module 118, the controller module 116 then utilizes the initial visible list 120 to start the search for any GPS satellite signals in step 408. The GPS receiver 102 then searches for a strong GPS satellites in step 410. Ideally, the GPS receiver 102 will detect and acquire at least a few strong GPS satellite signals where a strong GPS satellite signal is typically defined to be a GPS signal approximately greater than 36 dB-Hz (preferably greater than 40 dB-Hz with a probability of detection generally greater than 0.9 and a probability of false alarm that is typically negligible) up to 50 dB-Hz.

However, if no strong GPS signals are acquired, the GPS receiver 102 then proceeds to search for any weak GPS satellites, in step 412, that are available. The GPS receiver 102 then generates the weak satellite list 122 by adding any acquired weak GPS satellites in step 414. The GPS receiver 102 then creates the search list 124, in step 416, by subtracting the weak satellite list 122 from the GPS constellation list 126. The GPS receiver 102 then picks the next GPS satellite from the weak satellite list 122, in step 418, and determines whether the weak satellite list 122 is empty in determination step 420.

If the weak satellite list 122 is empty, there are no acquired weak GPS satellites and the GPS receiver 102 returns to step 414 and attempts to create a new weak satellite list 122. The sub-process may repeat as often as necessary to assure that the GPS receiver 102 is keeping track of any weak GPS satellites that may be present in the environment of operation of the GPS receiver 102. As an example, the sub-process may continue every 100 milliseconds.

If the weak satellite list 122 is not empty, the GPS receiver begins to generate a Doppler list, in step 422, for the acquired weak GPS satellites in the weak satellite list 122. The GPS receiver 102 then picks the next GPS satellite from the weak satellite list 122, in step 424, and determines if the search list 124 is empty in determination step 426.

If the search list 124 is empty, then the process returns to determination step 420 where the GPS receiver 102 again determines whether the weak satellite list 122 is empty. If the weak satellite list 122 is empty, then there are no acquired weak GPS satellites and the GPS receiver 102 returns to step 414 and attempts to create a new weak satellite list 122. The sub-process may repeat as often as necessary to assure that the GPS receiver 102 is keeping track of any weak GPS satellites that may be present in the environment of operation of the GPS receiver 102.

If the weak satellite list 122 is not empty, the GPS receiver 102 again begins to generate a Doppler list, in step 422, for the acquired weak GPS satellites in the weak satellite list 122. The GPS receiver 102 then picks the next GPS satellite from the weak satellite list 122, in step 424, and determines if the search list 124 is empty in determination step 426.

If the search list is not empty, in determination step 426, the GPS receiver 102 picks the next Doppler from the weak satellite list 122, in step 428, and determines whether the Doppler list 128 is empty in determination step 430. If the Doppler list 128 is empty, the process returns to determination step 426 and determines if the search list 124 is empty.

Similar to before, if the search list 124 is empty, then the process returns to determination step 420 where the GPS receiver 102 again determines whether the weak satellite list 122 is empty. If the weak satellite list 122 is empty, then there are no acquired weak GPS satellites and the GPS receiver 102 returns to step 414 and attempts to create a new weak satellite list 122. Again, the sub-process may repeat as often as necessary to assure that the GPS receiver 102 is keeping track of any weak GPS satellites that may be present in the environment of operation of the GPS receiver 102.

If the weak satellite list 122 is not empty, the GPS receiver 102 again begins to generate a Doppler list, in step 422, for the acquired weak GPS satellites in the weak satellite list 122. The GPS receiver 102 then picks the next GPS satellite from the weak satellite list 122, in step 424, and determines if the search list 124 is empty in determination step 426.

If the search list is not empty, in determination step 426, the GPS receiver 102 picks the next Doppler from the weak satellite list 122, in step 428, and determines whether the Doppler list 128 is empty in determination step 430. If the Doppler list 128 is not empty, the GPS receiver 102 then performs a correlation of the input signal with locally generated PN code of the satellite from the search list at the Doppler frequency from the Doppler list 128 in step 432.

The GPS receiver 102 then determines, in determination step 434, whether a strong GPS satellite has been detected. If no strong GPS satellites have been detected, the process returns to determination step 430 where the sub-process again repeats from determination step 430, through determination steps 426 and 420 and steps 414-432 and returns to determination step 434 again.

If, instead, a strong GPS satellite has been detected, the process continues to step 436 where the GPS receiver 102 removes the existing weak GPS satellite from the assigned GPS receiver channel and then removes the weak GPS satellite from the weak satellite list 122 in step 438. Finally, the GPS receiver 102 assigns the strong GPS signal to the GPS receiver channel that was previously assigned to the now removed weak GPS satellite in step 440. The process then returns to determination step 420 and the process repeats continuously until the GPS receiver 102 is power down.

The above mentioned examples utilize autocorrelation techniques on the raw data of a currently tracked GPS satellite in order to remove any false lock onto a code offset corresponding to a secondary peak during acquisition.

Currently, during acquisition, while searching for the code offset, if the GPS receiver 102 latches onto to the first occurrence of the highest peak of a GPS signal while operating at an C/N0 <32 dB-Hz, there is a possibility that the GPS receiver 102 may have acquired the code phase corresponding to a secondary peak of a strong GPS satellite signal. In response, the Fast Acquisition System 100 checks and if necessary corrects for this condition. The check may be done using the autocorrelation based technique described below. If a false lock is detected, then a reacquisition for a narrow window, centered on the newly detected code phase, may be done.

As an example, a software-based autocorrelation process may be invoked if the acquired weak GPS satellite signal has a C/N0 less than 32 db-Hz. The input data for the autocorrelation may be the decimated raw IQ samples obtained at, for example, 2.046 MHz sample rate. In this example, every raw IQ sample consists of {Isign, Imag, Qsign and Qmag}. The sign and magnitude bits are used to obtain corresponding I,Q values {−3, −1, +1, +3}. These values are phase de-rotated using the measured Doppler information. A down sampling may be utilized to convert from 2 chips/sample to 1 chip/sample and the number of 1 ms data sets that may be coherently integrated is based on the probability of detection $P_d$ and probability of false alarm $P_{fa}$.

The autocorrelation may be done with the input data from the received plurality of GPS signals and the local C/A code. To save computation time, this process may be done in frequency domain using an FFT. Additionally, all FFT's and inverse FFT's may be calculated on the fly.

In general, the output of the FFT will be compared to the currently tracked code phase of weak GPS satellite signal and if there is a mismatch, then the autocorrelation detection will be signaled. If, instead, there is no mismatch, the autocorrelation is verified.

The processes described in FIGS. 3 and 4 may be performed by hardware or software. If the process is performed by software, the software may reside in software memory included in Memory Storage Module 118 in the mobile unit or cellular network server. The software in software memory may include an ordered listing of executable instructions for implementing logical functions (i.e., "logic" that may be implemented either in digital form, such as digital circuitry or source code, or in analog form, such as analog circuitry or an analog source such as an analog, electrical, sound or video signal), may selectively be embodied in any computer-readable (or signal-bearing) medium for use by or in connection with an instruction execution system, apparatus, or device, such as a computer-based system, processor-containing system, or other system that may selectively fetch the instructions from the instruction execution system, apparatus, or device and execute the instructions. In the context of this document, a "computer-readable medium" and/or "signal-bearing medium" is any means that may contain, store, communicate, propagate, or transport the program for use by or in connection with the instruction execution system, apparatus, or device. The computer readable medium may selectively be, for example but not limited to, an electronic, magnetic, optical, electromagnetic, infrared, or semiconductor system, apparatus, device, or propagation medium. More specific examples: "a non-exhaustive list" of the computer-readable medium would include the following: an electrical connection ("electronic") having one or more wires, a portable computer diskette (magnetic), a RAM (electronic), a read-only memory "ROM" (electronic), an erasable programmable read-only memory (EPROM or Flash memory) (electronic), an optical fiber (optical), and a portable compact disc read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

While various embodiments of the invention have been described, it will be apparent to those of ordinary skill in the art that many more embodiments and implementations are possible that are within the scope of this invention.

What is claimed is:

1. A method for searching for Global Positioning System (GPS) satellites with a multi-channel GPS receiver, wherein the multi-channel GPS receiver receives a plurality of GPS signals where each GPS signal corresponds to a GPS satellite having a GPS satellite identification number ("GPS satellite ID"), the method comprising:

assigning each GPS satellite ID corresponding to each received GPS signal from the received plurality of GPS signals to an individual channel of the multi-channel GPS receiver;

selecting a channel of the multi-channel GPS receiver as a monitoring channel, where the monitoring channel is not one of the individual channel channels assigned to receive GPS signal from the received plurality of GPS signals;

and monitoring the received GPS signals with the monitoring channel, where the monitoring channel employs a low-sensitivity search.

2. The method of claim 1, wherein assigning includes utilizing a visible list to assign each GPS satellite ID to each individual channel.

3. The method of claim 2, wherein selecting includes selecting a first non-assigned channel and assigning the GPS satellite ID from an initial visible list.

4. The method of claim 2, wherein selecting includes selecting the channel assigned to a lowest elevation satellite upon assignment of all channels.

5. The method of claim 1, wherein selecting includes selecting a last channel of the multi-channel GPS receiver when all channels are assigned and the visible list is unavailable.

6. The method of claim 1, further including
determining the position of the multi-channel GPS receiver, and
monitoring a channel assigned to a satellite ID with a low carrier-to-noise (C/No).

7. The method of claim 6, wherein monitoring includes determining a false lock at the channel.

8. The method of claim 1, further including determining whether a GPS satellite ID is assigned to the monitoring channel.

9. The method of claim 8, including selecting a next GPS satellite ID when the GPS satellite ID searched is assigned to a channel when the a satellite ID has not been assigned to the monitoring channel.

10. The method of claim 9, further including searching the remaining satellites in the GPS constellation after all the common satellites are searched.

11. A method for searching for Global Positioning System ("GPS") satellites with a Fast Acquisition System within a multi-channel GPS receiver, where the multi-channel GPS receiver receives a plurality of GPS signals wherein each GPS signal corresponds to a GPS satellite having a GPS satellite identification number (Satellite ID) and each GPS signal has a corresponding received GPS satellite Doppler frequency, and the Fast Acquisition System has an initial visible list of GPS satellites and a GPS satellite constellation list, the method comprising:

assigning each GPS satellite ID corresponding to each received GPS signal from the received plurality of GPS signals to an individual channel of the multi-channel GPS receiver;

selecting a channel of the multi-channel GPS receiver as a monitoring channel, where the monitoring channel is not one of the individual channel channels assigned to receive GPS signal from the received plurality of GPS signals;

monitoring the received GPS signals with the monitoring channel, where the monitoring employs a low-sensitivity search;

generating a weak list of GPS satellites from the received plurality of GPS signals;

generating a search list of GPS satellites from the weak list of GPS satellites;

searching the received plurality of GPS signals utilizing the search list of GPS satellites; and determining whether a strong GPS satellite signal exists from the received plurality of GPS signals.

12. The method of claim 11, wherein generating the weak list of GPS satellites includes
determining a weak GPS satellite signal from the received plurality of GPS signals, and
generating the weak list of GPS satellites including the weak GPS satellite.

13. The method of claim 12, wherein generating a search list of GPS satellites includes
comparing the weak list of GPS satellites to the GPS constellation list, and
generating the search list of GPS satellites where the search list of GPS satellites includes all the GPS satellites in the GPS satellite constellation list less the GPS satellites in the weak list of GPS satellites.

14. The method of claim 13, wherein searching includes
determining a Doppler frequency for the weak GPS satellite signal, and
searching the received plurality of GPS signals utilizing the Doppler frequency of the weak GPS satellite signal.

15. The method of claim 14, wherein searching further includes
generating a Doppler list of Doppler frequency values from the determined weak GPS satellite signal Doppler frequency, and
searching the received plurality of GPS signals utilizing the Doppler list.

16. A Fast Acquisition System within a multi-channel Global Positioning System ("GPS") receiver, where the multi-channel GPS receiver receives a plurality of GPS signals wherein each GPS signal corresponds to a GPS satellite having a GPS satellite identification number (Satellite ID) and each GPS signal has a corresponding received GPS satellite Doppler frequency, and the Fast Acquisition System has an initial visible list of GPS satellites and a GPS satellite constellation list, the Fast Acquisition System comprising:

means for assigning each GPS satellite ID corresponding to each received GPS signal from the received plurality of GPS signals to an individual channel of the multi-channel GPS receiver;

means for selecting a channel of the multi-channel GPS receiver as a monitoring channel, where the monitoring channel is not one of the individual channel channels assigned to receive GPS signal from the received plurality of GPS signals;

means for monitoring the received GPS signals with the monitoring channel, where the means for monitoring employs a low-sensitivity search;

means for generating a weak list of GPS satellites from the received plurality of GPS signals;

means for generating a search list of GPS satellites from the weak list of GPS satellites;

means for searching the received plurality of GPS signals utilizing the search list of GPS satellites; and means for determining whether a strong GPS satellite signal exists from the received plurality of GPS signals.

17. The Fast Acquisition System of claim 16, wherein generating the weak list of GPS satellites means includes
means for determining a weak GPS satellite signal from the received plurality of GPS signals, and
means for generating the weak list of GPS satellites including the weak GPS satellite.

18. The Fast Acquisition System of claim 17, wherein generating a search list of GPS satellites means includes
   means for comparing the weak list of GPS satellites to the GPS constellation list, and
   means for generating the search list of GPS satellites where the search list of GPS satellites includes all the GPS satellites in the GPS satellite constellation list less the GPS satellites in the weak list of GPS satellites.

19. The Fast Acquisition System of claim 18, wherein searching means includes
   means for determining a Doppler frequency for the weak GPS satellite signal, and
   means for searching the received plurality of GPS signals utilizing the Doppler frequency of the weak GPS satellite signal.

20. The Fast Acquisition System of claim 19, wherein searching means further includes
   means for generating a Doppler list of Doppler frequency values from the determined weak GPS satellite signal Doppler frequency, and
   means for searching the received plurality of GPS signals utilizing the Doppler list.

21. A signal-bearing medium having software for searching for Global Positioning System ("GPS") satellites with a Fast Acquisition System within a multi-channel Global Positioning System ("GPS") receiver, where the multi-channel GPS receiver receives a plurality of GPS signals wherein each GPS signal corresponds to a GPS satellite having a GPS satellite identification number (Satellite ID) and each GPS signal has a corresponding received GPS satellite Doppler frequency, and the Fast Acquisition System has an initial visible list of GPS satellites and a GPS satellite constellation list, the signal-bearing medium comprising:
   logic configured for assigning each GPS satellite ID corresponding to each received GPS signal from the received plurality of GPS signals to an individual channel of the multi-channel GPS receiver;
   logic configured for selecting a channel of the multi-channel GPS receiver as a monitoring channel;
   logic configured for monitoring the received GPS signals with the monitoring channel, where the logic configured for monitoring employs a low-sensitivity search;
   logic configured for generating a weak list of GPS satellites from the received plurality of GPS signals;
   logic configured for generating a search list of GPS satellites from the weak list of GPS satellites;
   logic configured for searching the received plurality of GPS signals utilizing the search list of GPS satellites; and
   logic configured for determining whether a strong GPS satellite signal exists from the received plurality of GPS signals.

22. The signal-bearing medium of claim 21, wherein logic configured for generating the weak list of GPS satellites includes
   logic configured for determining a weak GPS satellite signal from the received plurality of GPS signals, and
   logic configured for generating the weak list of GPS satellites including the weak GPS satellite.

23. The signal-bearing medium of claim 22, wherein logic configured for generating a search list of GPS satellites includes
   logic configured for comparing the weak list of GPS satellites to the GPS constellation list, and
   logic configured for generating the search list of GPS satellites where the search list of GPS satellites includes all the GPS satellites in the GPS satellite constellation list less the GPS satellites in the weak list of GPS satellites.

24. The signal-bearing medium of claim 23, wherein logic configured for searching includes
   logic configured for determining a Doppler frequency for the weak GPS satellite signal and
   logic configured for searching the received plurality of GPS signals utilizing the Doppler frequency of the weak GPS satellite signal.

25. The signal-bearing medium of claim 24, wherein logic configured for searching further includes
   logic configured for generating a Doppler list of Doppler frequency values from the determined weak GPS satellite signal Doppler frequency, and
   logic configured for searching tile received plurality of GPS signals utilizing the Doppler list.

26. A Fast Acquisition System within a multi-channel GPS receiver, where the multi-channel GPS receiver receives a plurality of GPS signals wherein each GPS signal corresponds to a GPS satellite having a GPS satellite identification number (Satellite ID) and each GPS signal has a corresponding received GPS satellite Doppler frequency, and the Fast Acquisition System has an initial visible list of GPS satellites and a GPS satellite constellation list, the Fast Acquisition System comprising
   means for determining a weak GPS satellite signal from the received plurality of GPS signals, and
   means for generating the weak list of GPS satellites including the weak GPS satellite,
   means for comparing the weak list of GPS satellites to the GPS constellation list, and
   means for generating the search list of GPS satellites where the search list of GPS satellites includes all the GPS satellites in the GPS satellite constellation list less the GPS satellites in the weak list of GPS satellites,
   means for determining a Doppler frequency for the weak GPS satellite signal, and
   searching the received plurality of GPS signals utilizing the Doppler frequency of the weak GPS satellite signal.
   means for determining whether a strong GPS satellite signal exists from the received plurality of GPS signals by use of a monitoring channel that employs a low sensitivity search.

27. A Fast Acquisition System for searching for Global Positioning System (GPS) satellites with a multi-channel GPS receiver, wherein the multi-channel GPS receiver receives a plurality of GPS signals where each GPS signal corresponds to a GPS satellite having a GPS satellite identification number ("GPS satellite ID"), the Fast Acquisition System comprising:
   means for assigning each GPS satellite ID corresponding to each received GPS signal from the received plurality of GPS signals to an individual channel of the multi-channel GPS receiver;
   means for selecting a channel of the multi-channel GPS receiver as a monitoring channel; and
   means for monitoring the received GPS signals with the monitoring channel, where the monitoring employs a low-sensitivity search and the monitoring channel is not one of the individual channel channels assigned to receive GPS signal from the received plurality of GPS signals.

28. The Fast Acquisition System of claim 27, wherein means for assigning includes utilizing a visible list to assign each GPS satellite ID to each individual channel.

29. The Fast Acquisition System of claim 28, wherein means for selecting includes means for selecting a first non-assigned channel and assigning the GPS satellite ID from an initial visible list.

30. The Fast Acquisition System of claim 28, wherein means for selecting includes means for selecting the channel assigned to a lowest elevation satellite upon assignment of all channels.

31. The Fast Acquisition System of claim 27, wherein means for selecting includes means for selecting a last channel of the multi-channel GPS receiver when all channels are assigned and the visible list is unavailable.

32. The Fast Acquisition System of claim 28, further including
   means for determining the position of the multi-channel GPS receiver, and
   means for monitoring a channel assigned to a satellite ID with a low cater-to-noise density (C/No).

33. The Fast Acquisition System of claim 32, wherein means for monitoring includes means for determining a false lock at the channel.

34. The Fast Acquisition System of claim 27, further including means for determining whether a GPS satellite ID is assigned to the monitoring channel.

35. The Fast Acquisition System of claim 34, including means for selecting a next GPS satellite ID when the GPS satellite ID searched is assigned to a channel when the a satellite ID has not been assigned to the monitoring channel.

36. The Fast Acquisition System of claim 35, further including means for searching the remaining satellites in the GPS constellation after all the common satellites are searched.

\* \* \* \* \*